Jan. 3, 1939. M. B. BLEECKER 2,142,601
REACTION PROPULSION DEVICE
Filed April 19, 1935 3 Sheets-Sheet 1
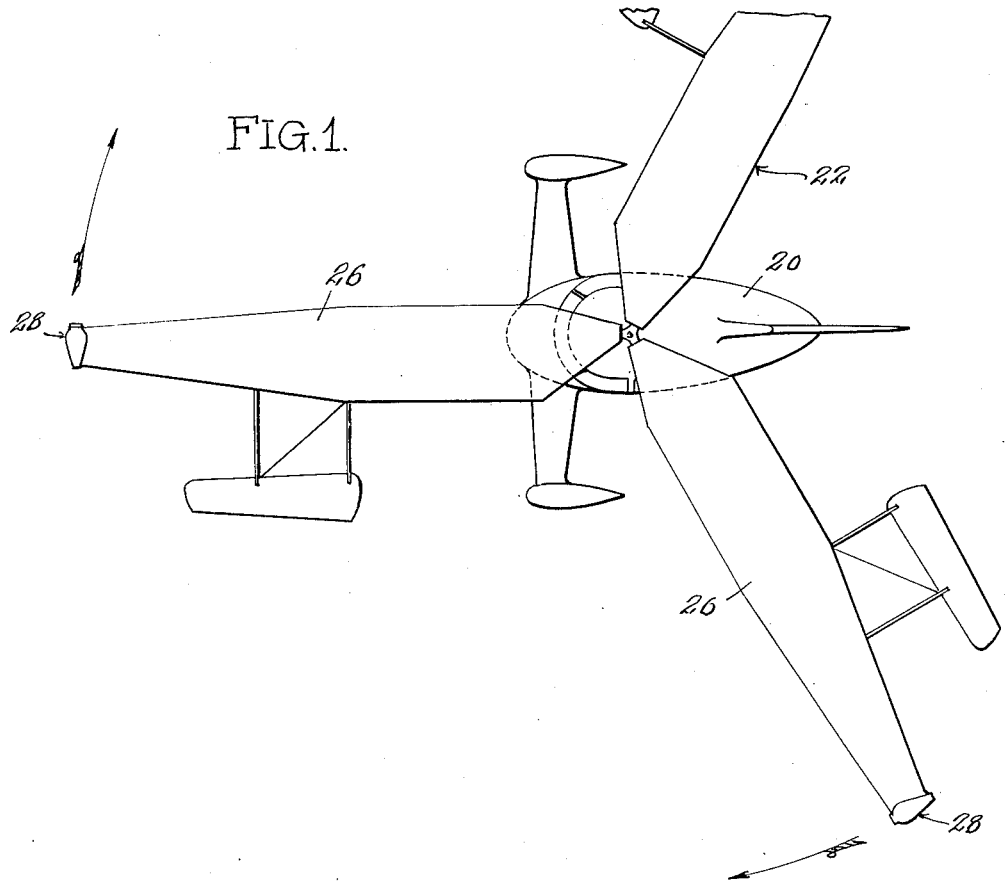
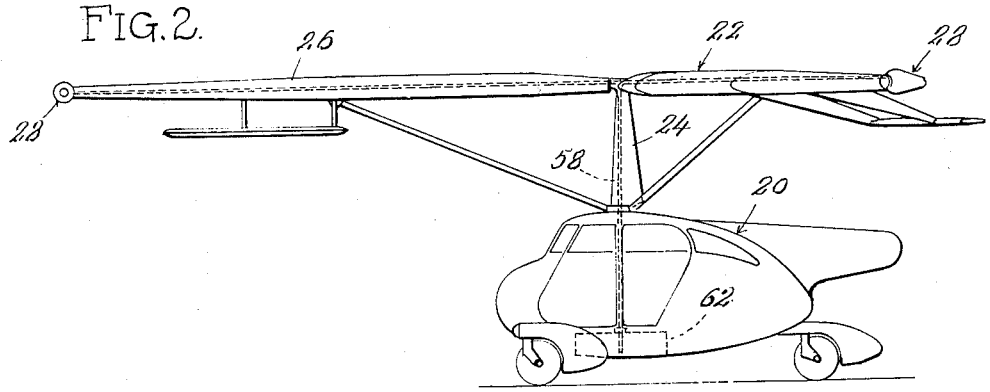
INVENTOR.
MAITLAND B. BLEECKER

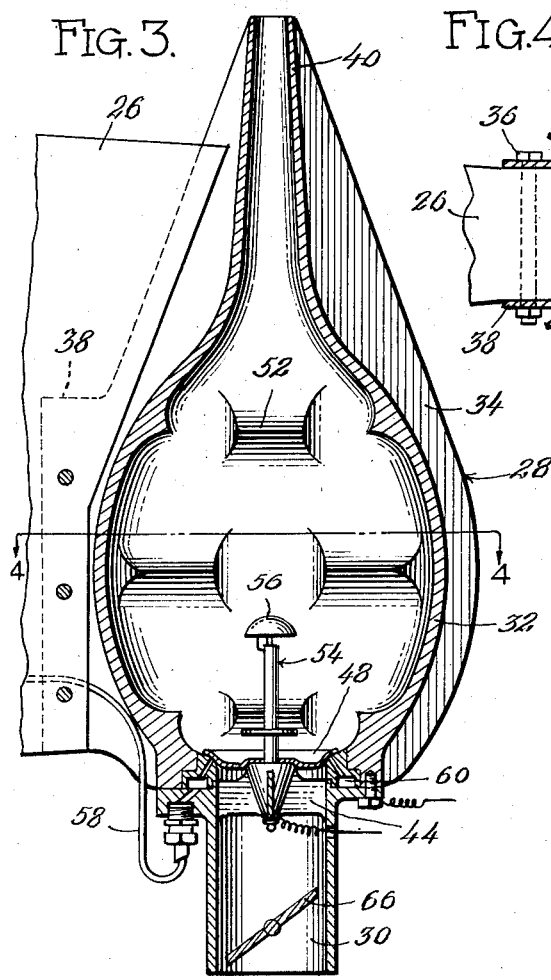
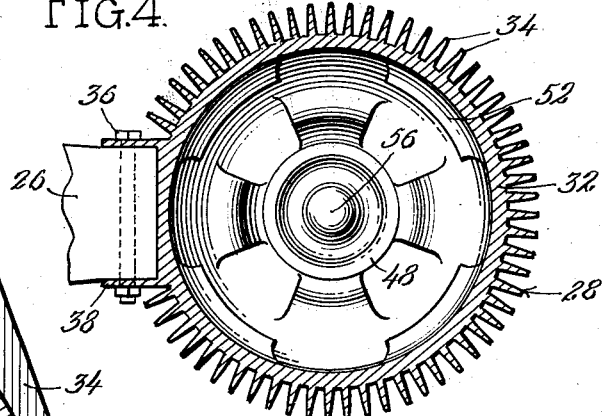
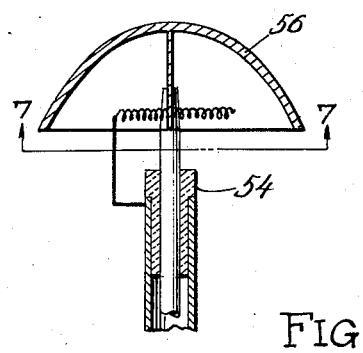
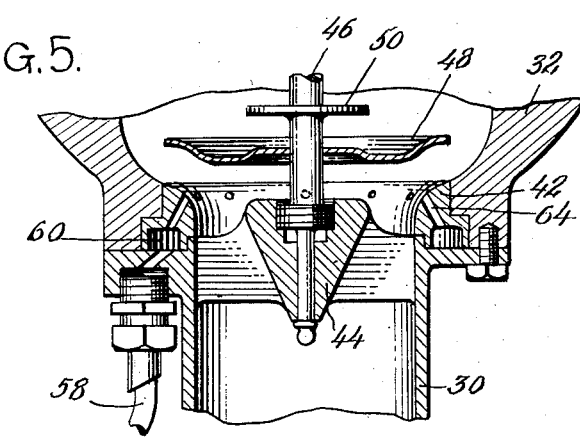
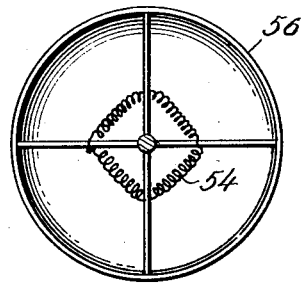

Jan. 3, 1939.    M. B. BLEECKER    2,142,601
REACTION PROPULSION DEVICE
Filed April 19, 1935    3 Sheets-Sheet 3

INVENTOR.
MAITLAND B. BLEECKER
BY
ATTORNEYS.

Patented Jan. 3, 1939

2,142,601

UNITED STATES PATENT OFFICE 2,142,601

REACTION PROPULSION DEVICE

Maitland B. Bleecker, Hempstead, N. Y.

Application April 19, 1935, Serial No. 17,186

2 Claims. (Cl. 60—35.6)

My invention relates to a method of and apparatus for producing a jet reaction motive force, and is concerned more particularly with the adaptation of such method and/or apparatus to aircraft.

One object of the invention is to provide an apparatus for producing a jet reaction motive force which is the acme of simplicity. Unlike prior devices designed to accomplish the same or a similar end, the device or apparatus of the present invention, although in effect an internal combustion engine, avoids the use of such complicated and heavy conventional engine parts as crankcase, crankshaft, pistons, connecting rods, etc. Only one moving part, to wit: an intake valve, is provided. The device, briefly described, comprises (1) an intake passage or opening, (2) means for injecting fuel into the entering air (such, for instance, as a suitable fuel injection means or a pressure type carburetor), (3) an automatic valve, (4) an explosion chamber, (5) a discharge passage or exhaust nozzle, (6) means for igniting the fuel air mixture (such, for instance, as a glow plug, spark plug or hot spot), and (7) means for throttling.

The advantages of a power unit thus characterized, other than those inherent in it due to its extreme simplicity, are manifold. Wear and tear, except only on the valve (the one moving part) are completely eliminated. It can be manufactured and sold at an exceedingly low cost. It is reliable in operation and needs no skilled operator or mechanic to keep it in serviceable shape. Low priced and low grade fuels of high B. t. u. content can be used. This is because of low initial compression which prevents detonation. (The compression ratio is low, but other advantages more than offset this factor. Low compression ratio, of course, means low thermal efficiency. Compression ratio is a function of initial ram, and in this case, of the cross sectional area of the discharge nozzle). Simplicity of design, economy and reliability of operation, and light weight, however, are the prime desiderata of the present concept.

A further object of the invention is the provision of a power unit which, though useful in many fields, is particularly suited to any aircraft having a rotatable wing or blade assembly such, for instance, as a helicopter, an autogiro, or an airplane. (In an airplane the one or more screw propellers constitute a rotatable blade assembly.) Used on a helicopter of the type described and illustrated in my U. S. Patent No. 1,909,450, issued May 16, 1933, the advantages are outstanding.

The machine of the patent (built and tested experimentally) involves the use of one or more power plants of conventional design and a plurality of propellers organized to effect rotation of the rotatable wing assembly. If power units such as herein contemplated be substituted for the power plant installation previously proposed, a great deal of the structural complication and complexity of design is wholly eliminated. No gears and shafting are required to be used; gear losses due to friction are avoided; and torque reactions against the fuselage or body of the craft are eliminated. Calculations and tests, conducted to date, show conclusively that the unusual complications of the alternate standard engine installations suggested in the patent, as compared to the extremely simple power plant installation herein contemplated, make the gross weight of the machine, in the latter case, approximately 50% less than the gross weight where one or more power plants of a conventional design are employed. In fact, the weight reduction is so marked that the power required in aircraft designed to carry a specified amount of useful load is enormously reduced, i. e., so much so that power units of the type herein contemplated are able to compete on an equal footing with conventional engines notwithstanding the loss of thermal efficiency characteristic of the former.

A still further object of the invention is to provide a power unit capable of producing a jet reaction motive force which is dependent, to a large extent, when used in aircraft, upon movement of the craft, or rotation of the wing or blade assembly, for its continued and successful operation. When used in connection with a rotatable wing or blade assembly, said units (one for each wing or blade) are preferably so disposed in relation to said assembly as to localize the points of power application at or toward the outer end of each wing or blade. By placing the jet nozzles at or near the wing or blade tips increased jet efficiency as well as ram effect (more fully hereinafter explained) is obtained. Thus disposed, the actual thrust required of the units is less because of the increased lever arm, i. e., radius of the wings or blades. Torque and horsepower requirements, however, are not affected by change or radius at which the thrust is applied.

Other and further objects and advantages of the invention will be hereinafter set forth.

In the drawings, wherein like reference characters denote like or corresponding parts:

Fig. 1 is a plan view of a helicopter type aircraft equipped with power units organized to effect rotation of its wing assembly. In this figure the arrows indicate the direction of rotation of said assembly;

Fig. 2 is a side elevation of the structure illustrated in Fig. 1;

Fig. 3 is a sectional view of one of the power units per se;

Fig. 4 is a section on the line 4—4 of Fig. 3;

Fig. 5 is an enlarged section of a portion of one of the power units;

Fig. 6 is a detail view of a suggested form of ignition means;

Fig. 7 is a section on the line 7—7 of Fig. 6;

Figure 10:
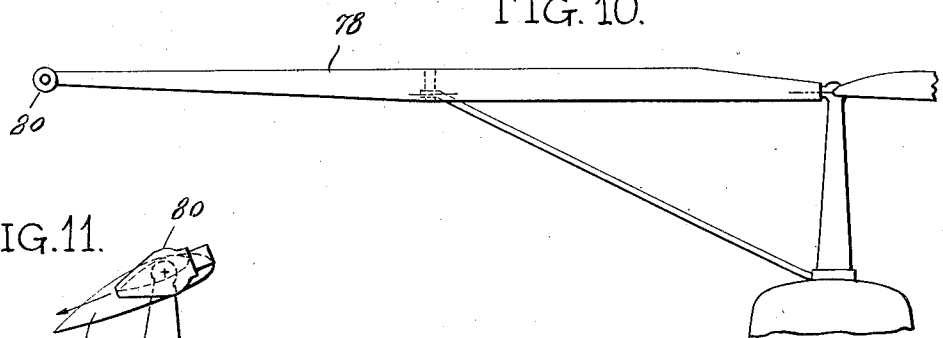
Figure 11:
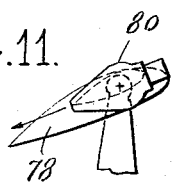
Figure 12:
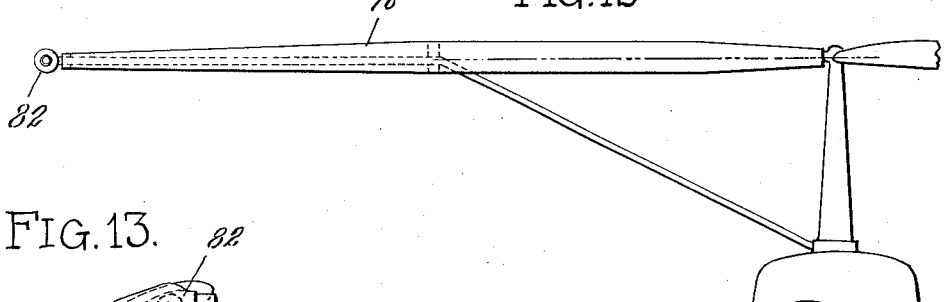
Figure 13:
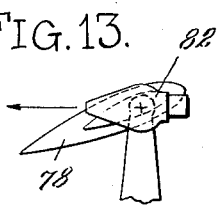

Figs. 10 and 12 are detail views showing alternative schemes of mounting the power units at the outer ends of the wings; and Figs. 11 and 13 are similar views showing in end elevation the relative positions of the power units and wings, with the latter biased, according to the showings respectively, of Figs. 10 and 12.

Referring first to Figs. 1 and 2, a helicopter is shown which includes a fuselage or body 20 upon which is mounted for rotation in a horizontal plane thereabove an airfoil, wing or blade assembly 22. The mounting for the assembly 22 comprises a main hollow hub or column 24 rotatably supported on the fuselage. The assembly 22 is composed of a series or set (three in the embodiment illustrated) of airfoils, wings or blades 26, each of which is of suitable form and of appropriate section, aspect ratio and surface area to develop a vertical lift when rotated, and each of which is mounted for rotation about its longitudinal axis to vary and adjust the respective angles of attack thereof so as to vary the lift which they individually and collectively develop during rotation as a complete assembly. Such a helicopter is generally similar to that described and illustrated in my said issued Patent No. 1,909,450 above referred to. Suffice it to say that the principle of operation and control of the helicopter herein diagrammatically illustrated is in all essential respects the same as that described and illustrated in said patent. The only fundamental difference resides in the choice of power plant installation.

In the machine of the patent an internal combustion engine of more or less conventional design is used to power drive the rotatable assembly through appropriate shafting and gearing. In the present development such a power plant installation is dispensed with. I provide instead a plurality of separate power units 28, each adapted to produce a jet reaction motive force effective at or toward the outer ends of the several airfoils 26. Since the several power units 28 are of identical construction, a detail description of one will suffice for all.

In Figs. 3 to 5, inclusive, the details of construction of one of the power units 28 is illustrated. It comprises an air intake passage 30 open at one end to the atmosphere and faced at its open end in the direction of rotation of said airfoil assembly 22, and an explosion or combustion chamber 32 into which said passage, at its opposite end, is adapted to discharge. The explosion chamber 32 is of generally streamline shape and is provided upon its exterior surface with longitudinally extending cooling fins 34 organized to offer a very minimum of resistance to passage of the chamber through the air. Bolts 36, or other appropriate fastening means, are provided to securely fasten the chamber 32 to its associated wing blade or airfoil 26; flanges 38, formed on the chamber, being provided for this purpose.

In line with the intake passage 30 and at the opposite end of the chamber 32, there is provided an outlet passage or exhaust nozzle 40 open to the atmosphere and faced counter to the direction of rotation of the assembly 22. At the discharge end of the nozzle 40 the jet reaction motive force effective to rotate said assembly is applied. This motive force is produced by the explosion of a fuel-air mixture within the chamber 32.

Adjacent to the discharge end of the inlet passage 30 a valve seat 42 is located, and adjacent to said valve seat and extending across said passage there is provided a valve support member 44 in the form of a spider. Said member 44 carries a fixed valve stem 46 extending vertically into the explosion chamber, and along this stem 46 a valve 48 is movable into and out of engagement with said seat. Movement of the valve 48 in a direction away from said seat is limited by a stop 50 carried by the stem.

On the inside of the exposed chamber 32 and either integral with or attached to the inner chamber wall, there is provided a plurality of baffles or deflectors 52 which are preferably staggered in relation to each other and offer a means effective to deflect the fuel-air mixture away from the discharge nozzle and toward the center of the explosion chamber whereat an ignition means 54 is disposed. As a further deflector means there is also mounted over and above the ignition means 54 (either a glow plug, spark plug or conventional hot spot) a dome-shaped member 56.

The fuel feed system illustrated in said Figs. 3 to 5, inclusive, comprises a feed line 58 open at one end to an annular duct 60 surrounding the valve seat 42 and at its opposite end open to a fuel tank 62. The tank 62 is preferably disposed within the fuselage or body 20 of the machine and the fuel is fed therefrom, by centrifugal force, through the feed line to said duct. No fuel pump is required to be used. From the duct 60 the fuel is sprayed into the explosion chamber 32 through radial openings 64 formed in the valve seat structure and so disposed in relation to the valve 48 as to be closed thereby when the latter is seated on its seat. By such an organization fuel is permitted to rush in when the valve is unseated and is effectively shut off during that period of operation when the valve 48 is in contact with its seat. Any suitable means such as a butterfly valve 66 may be provided to control the amount of air admitted to the explosion chamber.

Operation of the power unit is as follows: It depends essentially on a pressure differential between the intake and the exhaust for its ability to function. In other words, there must be a greater air pressure at the inlet end of the intake passage 30 than at the discharge end of the exhaust nozzle 40. Although capable of being established in several ways, the pressure differential is here shown as being established by relative airflow in the direction from the inlet toward the exhaust.

When the pressure differential is established (and such pressure differential is established by the rotation of the rotative assembly 22 in the embodiment of the invention here under discussion) the air rushing through the intake passage 30 picks up its fuel charge as it enters the explosion chamber 32, the valve 46 having in the meantime moved away from its seat. Due to the restricted outlet, the deflectors 52, and the fact that the fuel-air mixture is under a certain amount of pressure, such mixture or charge substantially fills the explosion chamber before reaching the centrally located ignition means 54. Once the mixture reaches the ignition means an explosion occurs, acting to seat the valve. As the temperature and pressure of the gases within the explosion chamber continue to rise, the products of combustion are forcibly expelled out through the exhaust nozzle at high velocity, and it is this explosion and expansion of the gases through the nozzle 40 that produce the thrust force (reaction motive force) effective to rotate the assembly 22. The moment the gases pass out through the nozzle 40, the pressure in the chamber 32 drops to a lower value than the pressure in the intake passage, thus causing an automatic repetition of the cycle described.

Throttling is preferably accomplished by means of the butterfly valve shown, and the control thereof should be effected manually to regulate at will the power output of the power unit. The automatic valve 48 should be light in weight in order to minimize inertia effects and thus permit it to follow the pressure changes so as to establish a rapid action and one that is at all times in proper phase with the thermal process taking place. Location of the glow plug (or other ignition means) is a matter of further experimentation to find the exact spot at which a maximum of power is obtainable. Experiments conducted to date, indicate the central location herein illustrated to be most effective. The ignition means must also be in a location of sufficiently reduced air velocity (which results from the intake ram) so that the rate of flame propagation is greater than the velocity of the fuel charges past the plug in order to prevent the charges from exploding without the chamber or failing to explode at all. Moreover, by properly designing the glow plug it can be made to operate as a hot spot in such manner that the electric current necessary to heat the plug sufficiently to ignite the gases when starting, may be shut off. If this be done, the heating element will then carry over its heat between explosions and allow the device to run without any ignition current. It should also be pointed out that the rate of explosions per minute is the function of the ram effect, fuel air ratio, ignition means, valve lift (area of air entrance under valve), size and length of combustion or explosion chamber, location of plug, and cross sectional area and length of discharge nozzle. It is known that all of these factors affect the efficiency of the power unit and that each would appear to need optimum design if maximum power for minimum fuel consumption is to be obtained. Tests conducted, where ram is obtained by air blower means, indicate that the proportion and disposition of parts herein illustrated, give excellent results and indicate conclusively that considerable jet reaction motive force can be by such means produced.

Figure 8:
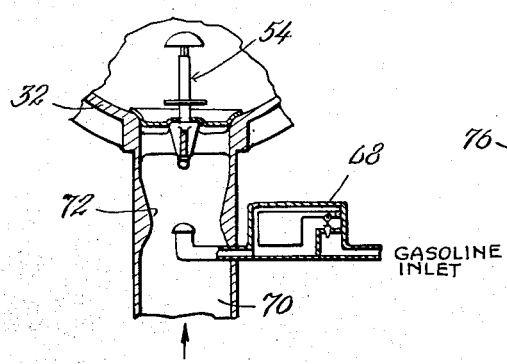
Fig. 8 is a section similar to Fig. 5 illustrating a modified form of fuel feed or induction means.

Referring to the modified arrangement of Fig. 8, it will be noted that the structure shown is generally the same as that illustrated in Fig. 5. Instead, however, of forcibly feeding the fuel into an annular duct beneath the valve seat and from there injecting it into the explosion chamber, the fuel is fed from a carburetor 68 directly into an intake passage 70 having a choke bore or venturi 72. In all other respects the two embodiments are the same. One advantage of the first described system, as compared to the system of Fig. 8, is that in the former, the valve 48, when seated, shuts off the fuel supply.

Figure 9:
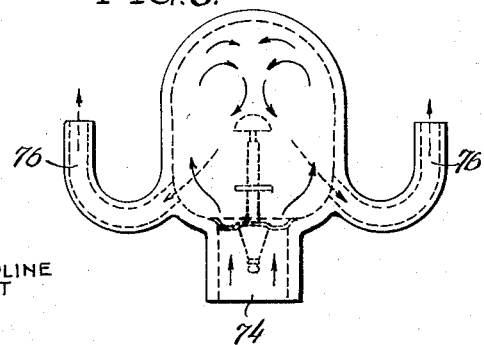
Fig. 9 is a side elevation of a modified form of explosion chamber.

In Fig. 9 is illustrated a suggested alternate form of explosion chamber. It embodies the idea of a double jet expulsion of the burned gases. This suggested arrangement has the advantage that the intake 74 and the exhaust nozzle 76 are unaligned. The gases, before ignition, would be subject to a slightly higher ram effect or compression than would be the case in a power unit of that type illustrated in Fig. 5.

Figs. 10 to 13, inclusive, merely illustrate alternative schemes of mounting the power units at the tips of the wings 78. In Figs. 10 and 11 the power unit 80 shown, is mounted to turn with the wing as its angle of attack is varied, whereas in Figs. 12 and 13 the wing 78 is mounted to turn independently of the power unit 82. In the latter embodiment, the power unit 82 is carried by the shaft or axle (not shown) about which the wing is free to turn. In the former embodiment, the power unit 80 is directly fastened to the structure of the wing in much the same manner as illustrated in Fig. 5.

In conclusion, it may be pointed out that the explosion chamber is of good streamline shape; that stainless steel, porcelain and other heat resisting materials have been found satisfactory as materials from which the nozzles 40 may be made; that the automatic valve is circular in shape, with center bore, and formed to a slight dished or cup-shape to insure rigidity of shape and prevent warping; and that the power units, shown, do not need to be assembled in a straight line, but may be made in any form found to be conducive to delayed ignition and to the attainment of a satisfactory compression or ram.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In apparatus for producing a jet reaction motive force, an explosion chamber provided at its opposite ends respectively with a constricted fuel inlet passage and with a constricted outlet passage for the exhaust, a valve movable to open and close communication between said inlet passage and said explosion chamber, baffle means within said explosion chamber organized to deflect the fuel entering said chamber so that its direction of flow is substantially reversed before reaching said outlet, and ignition means within said explosion chamber disposed behind said valve and without the direct flow path of the incoming fuel charges so that ignition is delayed until such time as the direction of fuel flow shall have been reversed by said baffle.

2. In apparatus for producing a jet reaction motive force, an explosion chamber provided at its opposite ends respectively with a constricted fuel inlet passage and with a constricted outlet passage for the exhaust, a valve seat surrounding the fuel inlet passage, a disk-type poppet valve movable into and out of contact with said valve seat to open and close communication between said inlet passage and said explosion chamber, movement of said valve being responsive to and primarily dependent upon whether or not the pressure in said explosion chamber is greater or less than the pressure in said inlet passage, a valve guide for said valve, an abutment carried by said valve guide with which said valve is adapted to contact in its fully open position, ignition means within said explosion chamber disposed closely adjacent to and behind said valve and without the direct flow path of the incoming fuel charges so that ignition is delayed until such time as the explosion chamber shall have been substantially completely filled with fuel, and baffle means within said explosion chamber organized to deflect the fuel prior to its ignition toward said ignition means.

MAITLAND B. BLEECKER.